Oct. 13, 1931.  H. G. SPRAKER  1,827,271
DIRECTION SIGNAL FOR VEHICLES
Filed May 29, 1930
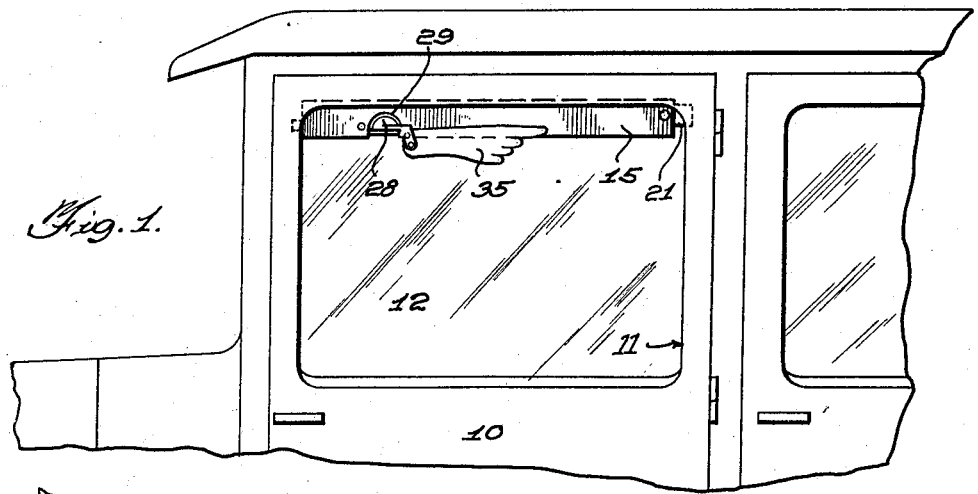
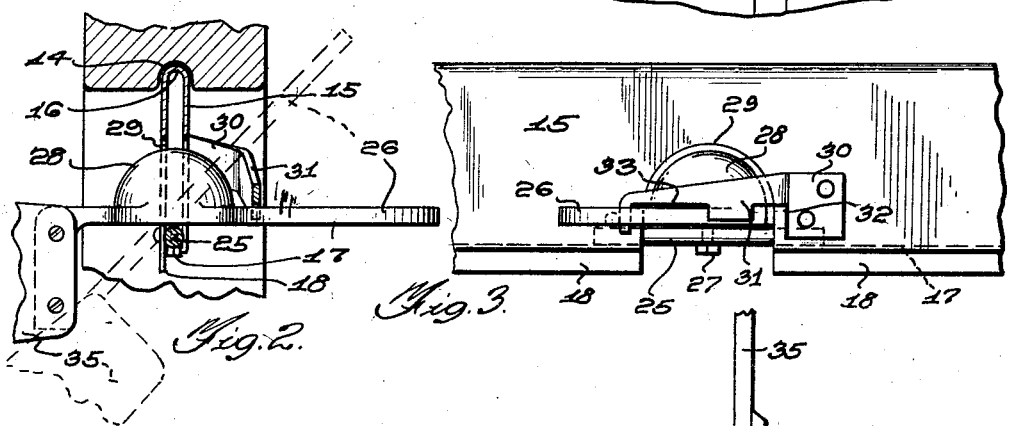
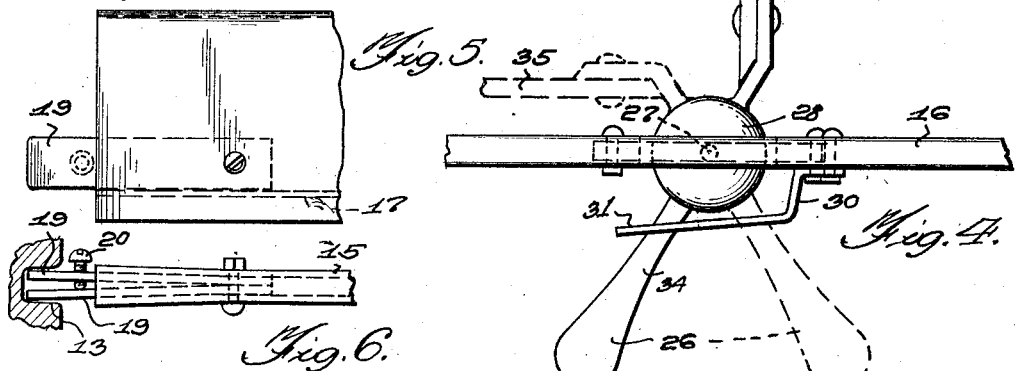
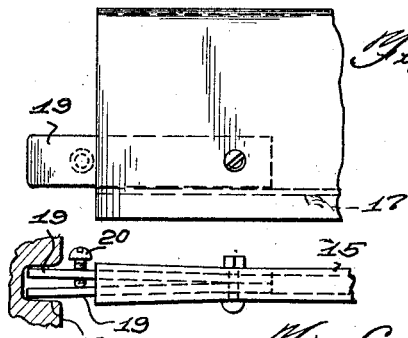
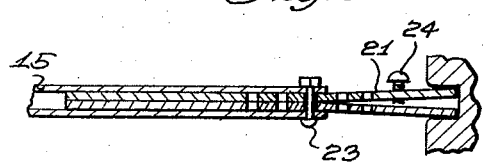
INVENTOR.
H. G. SPRAKER,
BY H. L. Woodward
ATTORNEY.

Patented Oct. 13, 1931

1,827,271

UNITED STATES PATENT OFFICE

HENRY G. SPRAKER, OF MUSKOGEE, OKLAHOMA

DIRECTION SIGNAL FOR VEHICLES

Application filed May 29, 1930. Serial No. 457,119.

The invention relates to direction signals for vehicles, whereby the intention of a motorist about to move his vehicle contrary to a given traffic flow is indicated to others at a distance, particularly those in cars approaching from the rear. It is an aim to present an improvement in that type of signal which is mounted on vehicles by insertion in the window opening over the shiftable light or glass. It is a special aim to present means for securing the signal firmly and rigidly in place without requiring alteration of the structure of the vehicle, or marring the finish in any way. Another object is to enable the coordination of my signal mounting with the vertically movable light of the window, to the end that a good weathertight joint is effected, and the good appearance of the vehicle preserved.

It is an aim to present a signal that may be operated readily in a simple manner from within the vehicle, and which will be effective in indicating the three principal signals required in modern traffic, viz: the right turn, the left turn, and the stop, without requiring the reading of signs on the signal.

A further purpose is to evolve novel securing means for such an appliance whereby it may be held in place without boring holes or driving nails or the like.

Additional objects, advantages, and features of invention are involved residing in the construction, arrangement and combination of parts, as may be more readily understood from the following description and accompanying drawings, wherein, Figure 1 is an elevation of the upper front portion of a vehicle equipped with my invention. The vertical dimension of the appliance here is somewhat exaggerated for convenience in illustration.

Figure 2 is an enlarged cross section at the pivot of the signal.

Figure 3 is an enlarged fragmentary inner elevation from the right of Figure 2.

Figure 4 is a top view of Figure 3.

Figure 5 is a detail elevation of the left hand end.

Figure 6 is a top view of Figure 5.

Figure 7 is a horizontal section at the right hand end.

There is illustrated a vehicle having a front door 10, formed with the window opening 11, in which there is a light 12, adapted to be raised and lowered in any usual way, the means for which is not illustrated, being no novel part of this invention. The opening 11 is provided with the usual side and top grooves 13—14 to receive the edges of the light 12, and these grooves may be of any usual form familiar on the motor vehicles of the day.

A signal mounting frame 15 is provided, which is substantially tubular, flattened and having a thickness approximating that of standard automobile glass. This frame is formed of a single blank of sheet metal bent on a medial line to form a rounded upper edge 16, the lower edge portion 17 of one side being bent sharply at right angles into abutment with the opposite depending edge 18 forming a stop or bottom flange. The depending edge is allowed to extend so as to form a weather stop adapted to lap the upper edge of the light 12 when raised into abutment with the flange at 17.

Secured to respective edge portions of the frame at one end above the flange 17 there are two closely spaced rigid steel bars 19 inserted within the tubular end of the frame and secured at a distance from the end of the frame by rivets extended entirely through the frame and the bars, although other means of securement may be employed. The extremities of the bars project sufficiently to permit the engagement of a set screw 20 in one to impinge against the other whereby the two may be separated after insertion in the window groove so as to wedge in the groove 13 and fix the frame in position in the window opening. At the opposite end a pair of longitudinally adjustable plates 21 are telescopically inserted in the tubular end of the frame each having a horizontal series of apertures 22 therein, and a screw 23 is engaged through the end portion of the frame and alined openings 22 of the plates, and tightened in a nut by which the plates are held in place in the frame. By adjustment of the screw 23 in the different openings 22, the plates may be extended more or less from the end of the frame. A set screw 24 is also engaged through one plate near its extremity, so as to impinge on an unapertured part of the other plate, to be used to separate the outer ends of the plates after insertion in the side groove 13 of the window and by wedging therein support the adjacent end of the frame in proper position, as well as preventing the frame from twisting out of alinement with the medial plane of the window, and affording an adequate support for the signal device which will now be described.

The lower edge portion of the frame 15 is cut out at a location well within the reach of an operator seated behind the wheel of the vehicle. This cut-out part or opening 29 extends upwardly from the lower edge about one inch in practice, and is about one inch wide. It has a semi-circular or arched upper edge portion.

A small revoluble shaft 25 extends across this opening, being simply laid on the flange 17. It is held in place by means of a lever 26 pivoted thereon by means of a pin 27 at right angles to the shaft. The lever is formed with a hemispherical enlargement 28 on its upper side snugly fitting in the arched upper part of the opening 29. The lever has pivotal movement on a horizontal axis by means of the shaft 25 and may also be moved on an axis at right angles to the shaft in any position on the horizontal axis by reason of being mounted by the pin 27 on the shaft 25. This is therefore universal pivotal mounting.

A keeper arm 30 is mounted by attachment of one end to the inner side of the frame 15, having a body portion 31 offset from and parallel to the frame 15 so as to clear the hemispherical enlargement 28. Its lower edge is formed with notches 32 and 33 the former near the forward end of the keeper while the other is near the rear extremity of the bar, which extremity is unattached and spaced from the frame 15. These notches are adapted to receive the adjacent end portion 34 of the lever 26 therein to hold it at respective limits of its horizontal movement. The lever is also adapted to be depressed and moved rearwardly at its inner part beyond the end of the arm 30, and then swung upwardly and forwardly over the arm for a purpose to be described.

When engaged in the forward notch 32 of the keeper arm 30, the lever 26 extends substantially at an angle of 35 degrees to the plane of the window or door, and its outer end is attached to or formed with a flat signal plate 35 in the form of a pointer, which extends parallel to the body of the vehicle or light 12 with the lever in the last mentioned position. For this purpose the plate 35 requires to be at an angle of substantially 60 degrees to the medial line of line of the lever. The rear notch 33 of the keeper arm is so located that the lever 26 moves through an arc of approximately 90 degrees in order to be shifted thereinto from the forward notch. This movement consequently carries the signal plate 35 from inoperative rearwardly extending position close beside the light of the window, into saliently extended position at right angles to the side of the vehicle. When so moved, it will be retained in position by reason of its weight bearing the inner part of the lever upward and retaining it in the notch 33. This is the signal of a left hand turn, and the stop signal may be effected if desired by oscillating the lever handle up and down while the plate is in this plane. The right hand turn may be indicated by bearing down on the lever handle while in this location. A left hand turn or stop may also be indicated by shifting the lever handle entirely to the rear of the arm 30 then raising it and swinging it forward slightly, just enough to engage over the arm 30 where it will be retained frictionally. The arm 30 will serve in this way because of the fact that it is of resilient material thin enough to flex readily, and is spaced closely enough to the inner face of the frame 14 to bind against the lever handle when swung forwardly thereover.

I claim:—

1. A signal device for the uses indicated comprising a plate-like mounting of tubular construction, adapted to be incorporated in a vehicle opening, formed of sheet metal bent substantially into U-shape in cross section, the longitudinal edges of one side portion being turned at right angles against the other side portion, forming a bottom flange, an opening formed through the plate and through the lower edge thereof, a rock shaft across the opening on the said bottom flange, a lever pivotally connected to the shaft on an axis at right angles to the shaft and having concentric parts fitting the opening, a handle on the lever projected at the inner side of the plate, and a signal piece at the opposite end of the lever without the mounting.

2. A signal device for the uses indicated comprising a plate-like mounting adapted to be incorporated in a vehicle opening, a semicircular opening being formed therein, a rock shaft across the opening adjacent the straight side of the opening, a lever pivoted on the shaft on an axis at right angles to the shaft, said lever having a semi-spherical part thereon concentric with the pivot and of a size to snugly fit the opening, a handle on the lever at the inner side of the mounting, and a signal piece at the outer end of the lever.

3. The structure of claim 1 in which the lower edge of the side of the mounting opposite said flange depends to overlap a window light.

4. The structure of claim 2 in which the ends of the arched part of the semi-circular opening intersect the lower edge of the mounting the opening forming a break in said lower edge.

In testimony whereof I affix my signature.

HENRY G. SPRAKER.